(12) United States Patent
Morikawa et al.

(10) Patent No.: US 11,245,698 B2
(45) Date of Patent: Feb. 8, 2022

(54) REGISTRATION SYSTEM AND REGISTRATION METHOD

(71) Applicant: FUJITSU LIMITED, Kawasaki (JP)

(72) Inventors: Ikuya Morikawa, Kawasaki (JP); Takao Ogura, Yokohama (JP); Dai Yamamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 331 days.

(21) Appl. No.: 16/246,577

(22) Filed: Jan. 14, 2019

(65) Prior Publication Data

US 2019/0238543 A1 Aug. 1, 2019

(30) Foreign Application Priority Data

Jan. 30, 2018 (JP) .............................. JP2018-014183

(51) Int. Cl.
*H04L 29/06* (2006.01)
*H04L 12/24* (2006.01)

(52) U.S. Cl.
CPC .............. *H04L 63/10* (2013.01); *H04L 41/12* (2013.01); *H04L 63/062* (2013.01); *H04L 63/08* (2013.01); *H04L 63/083* (2013.01); *H04L 63/126* (2013.01)

(58) Field of Classification Search
CPC ..... H04L 63/10; H04L 63/083; H04L 63/062; H04L 63/126; H04L 41/12; H04L 63/08
USPC .......................................................... 726/7
See application file for complete search history.

(56) References Cited

U.S. PATENT DOCUMENTS 9,838,205 B2 * 12/2017 Lundstrom ........... H04L 63/126

FOREIGN PATENT DOCUMENTS

JP   2005-057479   3/2005
JP   2010-128554   6/2010

OTHER PUBLICATIONS

JPOA—Office Action of Japanese Patent Application No. 2018-014183 dated Aug. 24, 2021 with Machine Translation.

* cited by examiner

*Primary Examiner* — Tu T Nguyen
(74) *Attorney, Agent, or Firm* — Fujitsu Patent Center

(57) ABSTRACT

A registration system includes a management apparatus configured to acquire first information of an authentication key for registration from a communication processing apparatus to communicate with the management apparatus, put a signature for the first information with a first registration key, and transmit the first information completed with the signature to the communication processing apparatus, and a registration server configured to acquire a registration request including the first information completed with the signature by the management apparatus from the communication processing apparatus to communicate with the registration server, verify the signature put for the first information included in the registration request, by using a second registration key paired with the first registration key, and register the first information included in the registration request, based on a result of verifying the signature put for the first information.

13 Claims, 9 Drawing Sheets

|  | MANAGEMENT APPARATUS | COMMUNICATION PROCESSING APPARATUS | REGISTRATION SERVER |
|---|---|---|---|
| INITIAL DATA | U: USER ID | D: APPARATUS ID | USER ID LIST INCLUDING U, APPARATUS ID LIST INCLUDING D |
| DATA BY PRELIMINARY PREPARATION | KR: REGISTRATION KEY | P: PASSWORD, V=H(P) | KRV: REGISTRATION KEY VERIFIER, NONCE VALUE LIST |

| | MANAGEMENT APPARATUS | COMMUNICATION PROCESSING APPARATUS | REGISTRATION SERVER |
|---|---|---|---|
| INITIAL DATA | U: USER ID | D: APPARATUS ID | USER ID LIST INCLUDING U, APPARATUS ID LIST INCLUDING D |
| DATA BY PRELIMINARY PREPARATION | KR: REGIST- RATION KEY | | KRV: REGISTRATION KEY VERIFIER, M: UPPER LIMIT OF NUMBER OF REGISTRATIONS, J: REMAINING NUMBER OF REGISTRATIONS (= M), NONCE VALUE LIST |

REGISTRATION SYSTEM AND REGISTRATION METHOD

CROSS-REFERENCE TO RELATED APPLICATION

This application is based upon and claims the benefit of priority of the prior Japanese Patent Application No. 2018-014183, filed on Jan. 30, 2018, the entire contents of which are incorporated herein by reference.

FIELD

The embodiments discussed herein are related to a registration system and a registration method.

BACKGROUND

In recent years, due to advances in information communication technology, compact electronic devices or computers having communication capability have been widely used. For example, as the electronic device having a communication capability (hereinafter, referred to as a "communication processing apparatus"), there are a cellular phone, a smart phone, a router, a network switch, a network camera, a network conference device, and various sensors/home appliances having a network function.

Most of the communication processing apparatuses communicate with a server on a local area network in a home, an office, or the like, or on the Internet. Generally, a server distinguishes each of many communication processing apparatuses for communication. Furthermore, the users (owners, users, etc.) of the communication processing apparatuses are often different from each other. Therefore, the server correctly identifies the communication processing apparatus, and further restricts access to the information and control capability for each communication processing apparatus to a specific user. Since the access is restricted as such, the communication processing apparatus and the server perform a work and a processing in a state where the server and the communication processing apparatus correctly share an authentication key pair and the server properly recognizes a user corresponding to each communication processing apparatus. The work and the processing performed in such a state is called a "registration" or a "registration work". Further, a server that accepts registration of the communication processing apparatus is called a "registration server". The registration server may be separate server from a service providing server that is responsible for original communication with the communication processing apparatus or one server may serve as both the registration server and the service providing server.

The phrase "authentication key pair" refers to a pair of an authentication key to be kept secret and a verifier corresponding to the authentication key. For example, in a registration process, the communication processing apparatus to be authenticated allows a server which authenticates the authentication key to possess a verifier. An example of the authentication key pair, that is, a pair of the authentication key and the verifier may include {k, k} for the authentication key k in a symmetric key encryption scheme and {private key (sk), public key (pk)} in a public key encryption scheme. Further, the example of the authentication key pair may include {s, H(s)} (H(•) is a cryptographic hash function) in the secret value s such as a password.

In the registration work, a management apparatus that automates and simply performs the work may be used by being locally connected to or approaching the communication processing apparatus. Examples of local communication by local connection may include, for example, universal serial bus (USB) communication and wired local area network (LAN) communication which are physically connected. Further, the local communication which is performed by the approach may include, for example, Bluetooth (registered trademark) communication, infrared communication and near field communication (NFC).

In association with the registration work performed using the management apparatus, a system is known, which includes a service providing server, a terminal apparatus, and an authentication server and flexibly controls allocation of an account by the service providing server while preventing leakage of personal information which is information on a user of a terminal. In such a system, the service providing server allocates an ID to the terminal. When server identification information and the ID are transmitted from the terminal, the authentication server transmits the password stored in association with the ID to the terminal. The terminal transmits the ID and the password to the service providing server. The service providing server provides a service to the user of the terminal based on the ID and the password.

Related techniques are disclosed in, for example, Japanese Laid-open Patent Publication No. 2010-128554.

SUMMARY

According to an aspect of the embodiments, a registration system includes a management apparatus configured to include a first memory configured to store a first registration key, and a first processor coupled to the first memory and the first processor configured to acquire first information of an authentication key for registration from a communication processing apparatus to communicate with the management apparatus, put a signature for the first information with the first registration key, and transmit the first information completed with the signature to the communication processing apparatus, and a registration server configured to include a second memory configured to store a second registration key paired with the first registration key, and a second processor coupled to the second memory and the second processor configured to acquire a registration request including the first information completed with the signature by the management apparatus from the communication processing apparatus to communicate with the registration server, verify the signature put for the first information included in the registration request, by using the second registration key, and register the first information included in the registration request, based on a result of verifying the signature put for the first information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the related art, there are cases where a safe and simple registration work is not sufficiently implemented.

For example, when a user locally connects to an incorrect communication processing apparatus, information on an authentication key that registers the communication processing apparatus in a registration server may be known to the communication processing apparatus that is erroneously connected. Further, in the case where the information on the authentication key is prepared on the communication processing apparatus side, the information on the authentication key is transferred to a locally connected management apparatus and the management apparatus transmits the information received from the communication processing apparatus to the registration server. In this case, a communication environment which communicates with the registration server needs to be prepared on the management apparatus side apart from the communication processing apparatus. Thus, the communication processing apparatus may not be registered in a place and a situation in which communication that requires a time for preparing the communication environment such as a wireless network may not be used, or the communication processing apparatus may not be registered with the management apparatus that does not have a communication function other than local communication.

Hereinafter, an embodiment of a technology capable of safely and easily registering the communication processing apparatus to the registration server will be described with reference to the accompanying drawings. In the embodiments, the same reference numerals are given to components having the same function, and redundant explanations thereof are omitted. Further, a registration system and a registration method to be described in the embodiments below are merely examples and do not limit the embodiments. Further, each of the following embodiments may be suitably combined within a range that is not inconsistent.

[System Configuration Example]

Figure 1:
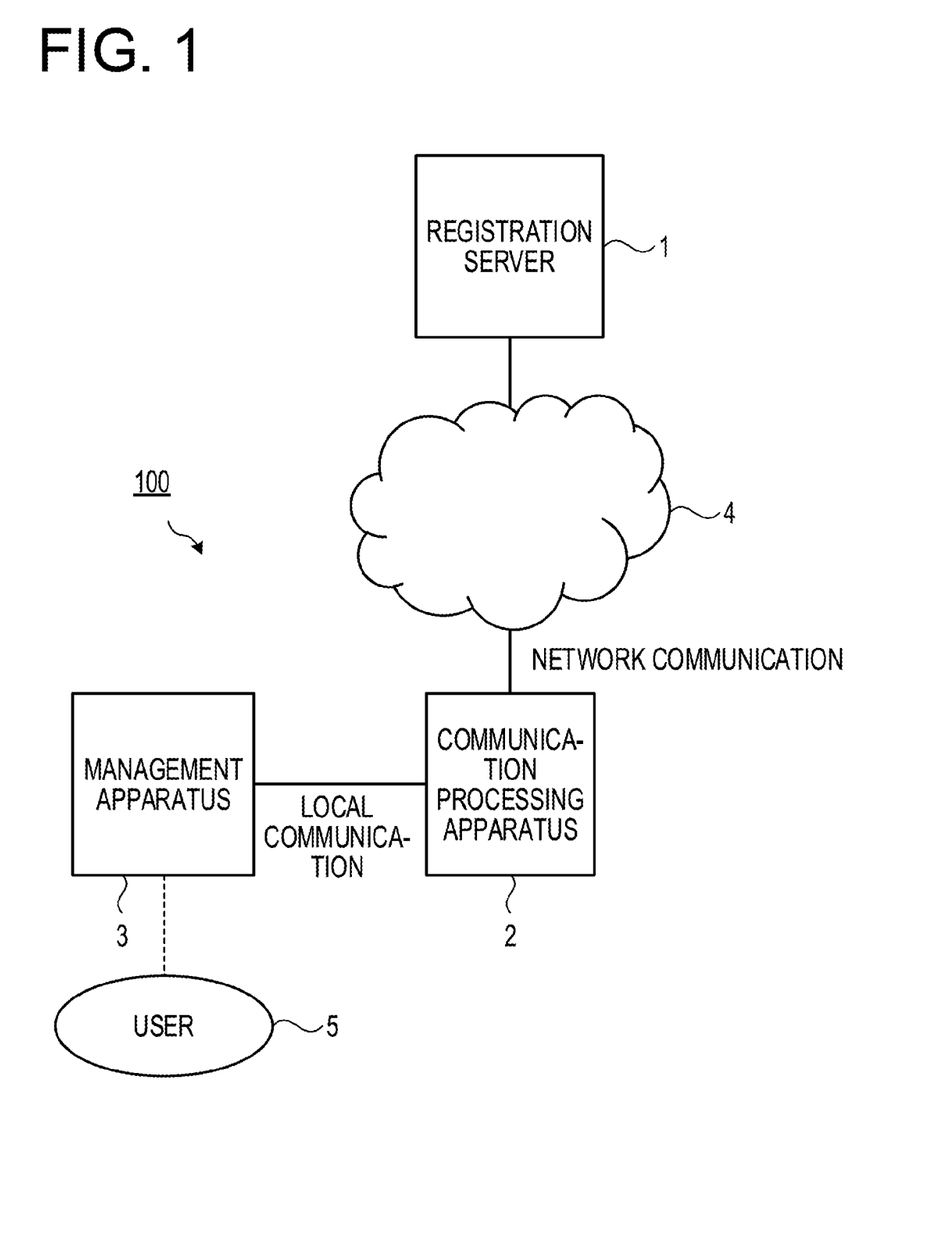
FIG. 1 is an explanatory diagram illustrating an example of a registration system according to an embodiment.

FIG. 1 is an explanatory diagram illustrating an example of a registration system according to an embodiment. As illustrated in FIG. 1, a registration system 100 includes a registration server 1, a communication processing apparatus 2, and a management apparatus 3. The registration server 1 and the communication processing apparatus 2 are connected to communicate with each other through a communication network 4 such as a local area network (LAN) or the Internet. The communication processing apparatus 2 and the management apparatus 3 are connected to communicate with each other through local communication performed by physical connection or an approach to a close proximity.

The local communication which is performed by the physical connection may include, for example, universal serial bus (USB) communication and wired LAN communication. Further, the local communication which is performed by the approach may include, for example, Bluetooth (registered trademark) communication, infrared communication, and near field communication (NFC) communication.

The registration server 1 is a server apparatus in which the communication processing apparatus 2 is to be registered. The communication processing apparatus 2 is, for example, an electronic apparatus which is newly registered in the registration server 1 and may adopt a network router, etc. as an example. The management apparatus 3 is a terminal apparatus used by a user 5 and may adopt a tablet personal computer (PC) as an example.

The communication processing apparatus 2 may communicate with the registration server 1 via the communication network 4 by automatic setting or manual setting. Further, it is assumed that user authentication has been completed between the management apparatus 3 and the registration server 1 and each of the management apparatus 3 and the registration server 1 stores user ID U which identifies the user 5.

It is assumed that the communication processing apparatus 2 stores an apparatus ID D that identifies its own apparatus, and the registration server 1 also holds the same apparatus ID D as a part of a list of a valid communication processing apparatus 2. The apparatus ID D may be displayed by engraving or sealing on an outer surface of the communication processing apparatus 2 so that the user 5 may view the apparatus ID D.

In the registration system 100, it is assumed that the communication processing apparatus 2 itself which is connected to the management apparatus 3 through the location communication prepares the authentication key for registration and further performs a registration process with the registration server 1 by using a network communication capability of the communication processing apparatus 2 itself. By the registration process, the communication processing apparatus 2 and the registration server 1 have information of an authentication key pair. It is also assumed that by the authentication key pair, the communication processing apparatus 2 and the registration server 1 authenticate each other to safely communicate with each other.

A safe communication is, for example, a communication in which the registration server 1 of a communication partner is an authentic one, not a fake impersonation as seen from the communication processing apparatus 2, by the authentication, and further, eavesdropping and tempering of data on a communication path are difficult. An example of a communication means involving such authentication may be transport layer security (TLS).

Figure 2:
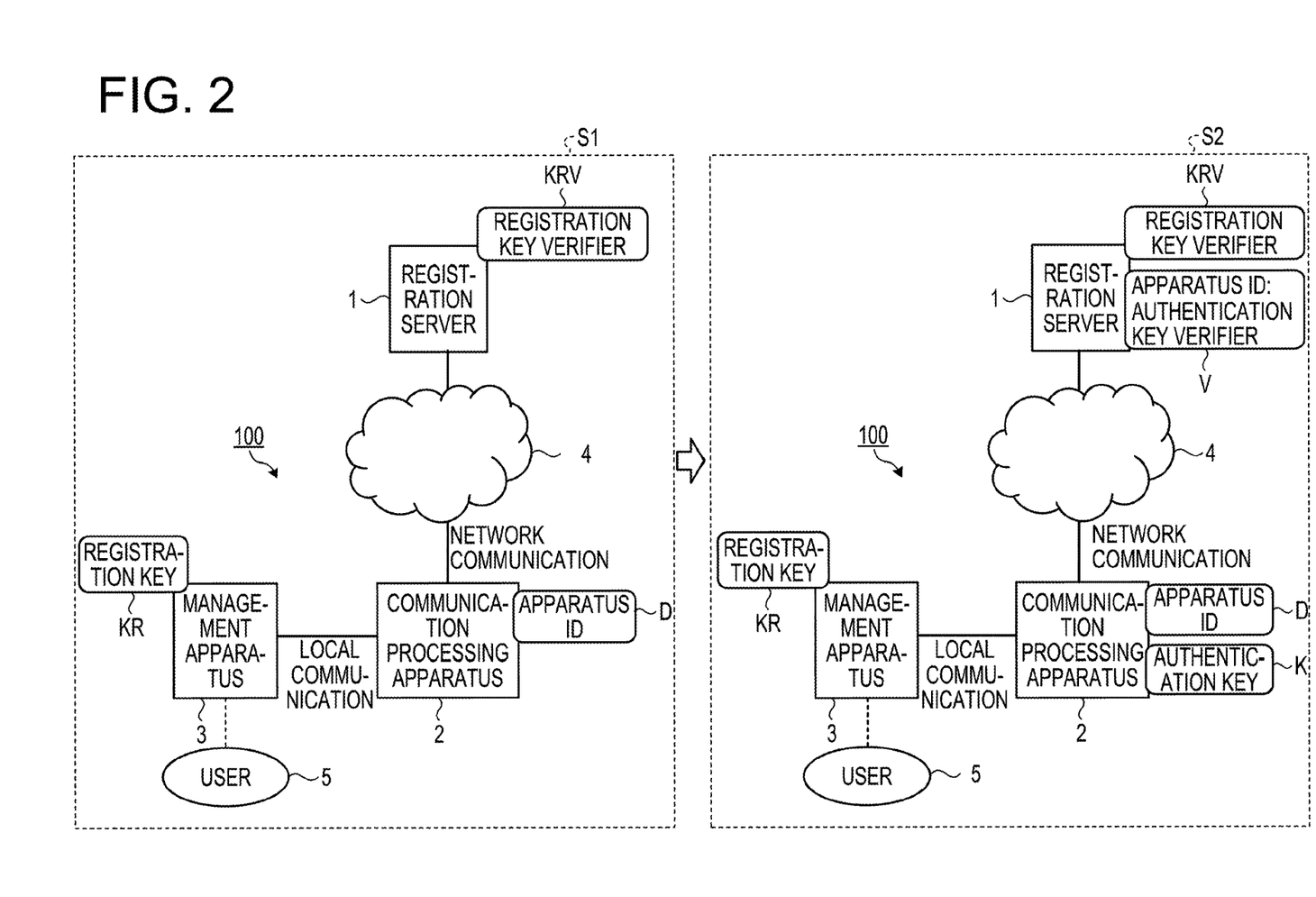
FIG. 2 is an explanatory diagram illustrating a state before and after registration of a registration system according to an embodiment.

FIG. 2 is an explanatory diagram illustrating a state before and after registration of a registration system 100 according to an embodiment. As illustrated in FIG. 2, S1 represents a state of the registration system 100 before registration of an authentication key pair (K, V) in the communication processing apparatus 2 and the registration server 1. Further, S2 represents a state of the registration system 100 after registration of the authentication key pair (K, V) in the communication processing apparatus 2 and the registration server 1.

In a registration process of registering the authentication key pair (K, V), it is verified that the valid management apparatus 3 is connected to the communication processing apparatus 2 by the local communication. Therefore, before the registration (S1), information of a key pair which is different from the authentication key pair (K, V) of registration key pair (KR, KRV) for registration is prepared in advance in the management apparatus 3 and the registration server 1. For example, it is assumed that the management apparatus 3 has a registration key KR and the registration server 1 has a registration key verifier KRV.

When the registration server 1 verifies whether the corresponding registration process is a registration process that involves the management apparatus 3 having a correct registration key KR, the registration server 1 registers an authentication key verifier V corresponding to the authentication key K sent from the communication processing apparatus 2. As a result, when the registration process in which the management apparatus 3 having the correct registration key KR involves is performed (S2), the authentication key pair (K, V) is registered in the communication processing apparatus 2 and the registration server 1.

A method of safely sharing the registration key pair (KR, KRV) between the management apparatus 3 and the registration server 1 may be easily implemented by an existing method. For example, the user may directly input the registration key pair (KR, KRV) in the management apparatus 3 and the registration server 1. Alternatively, the registration key pair (KR, KRV) may be stored in a computer-readable storage medium such as a memory card so as to be read by the management apparatus 3 and the registration server 1. Alternatively, when a communication is available through the network, the registration key pair (KR, KRV) may be exchanged by using a safe communication scheme such as TLS.

Figure 3:
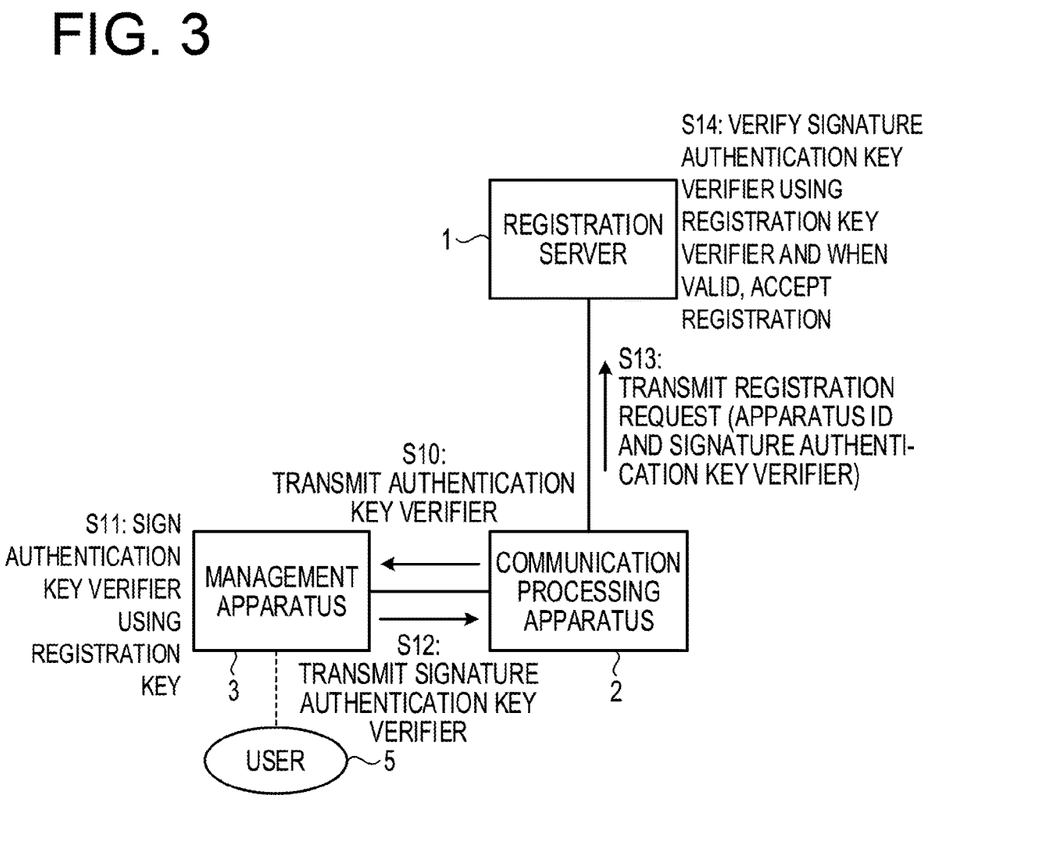
FIG. 3 is an explanatory diagram for describing an outline of a registration process of a registration system according to an embodiment.

FIG. 3 is an explanatory diagram for describing an outline of a registration process of a registration system 100 according to an embodiment. As illustrated in FIG. 3, the outline of the registration process of the registration system 100 takes the order of steps S10 to S14 as an example.

Specifically, the communication processing apparatus 2 transmits the authentication key verifier V to the management apparatus 3 via the local communication (S10). The management apparatus 3 puts a signature for the received authentication key verifier (V) using the registration key KR (S11). Here, the term "signature" enables verification of validity using the key pair and includes, for example, an encryption/digital signature using a symmetric key encryption scheme or a public key encryption scheme, a hashing using a key by a cryptographic hash function, and a message authentication code.

Subsequently, the communication processing apparatus 2 transmits the signature authentication key verifier V to the management apparatus 2 via the local communication (S12). The communication processing apparatus 2 transmits the received signature authentication key verifier V and the apparatus ID D to the registration server 1 as a registration request (S13).

Next, the registration server 1 verifies the signature of the received signature authentication key verifier V using the registration key verifier KRV. For example, in the case of the correct registration key pair (KR, KRV), the signature by the registration key KR may be verified to be correct by the registration key verifier KRV. Accordingly, the registration server 1 accepts the registration of the authentication key verifier V when a verification result of the signature is correct (S14).

As a separate procedure from the above procedure, when a registration procedure can be executed multiple times, using the same registration request multiple times may be avoided and thus, the signature may be put after different values are assigned to the authentication key verifier V every time. In addition, there are a method for assigning the number of times of registration on the side of the management apparatus 3, and a method in which the communication processing apparatus 2 receives a provisional registration ID from the registration server 1, transfers the provisional registration ID to the management apparatus 3, and assigns the provisional registration ID. Furthermore, registration conditions associated with the registration key verifier KRV, etc., for example, the number of available registration times, a type of communication processing apparatus 2 that may be registered, a range of the date and time, an address range on the network, a range of a physical location, etc., may be determined in advance in a storage unit 33 of the registration server 1. In addition, the registration server 1 may be configured to accept the registration request when a predetermined registration condition is satisfied.

Figure 4:
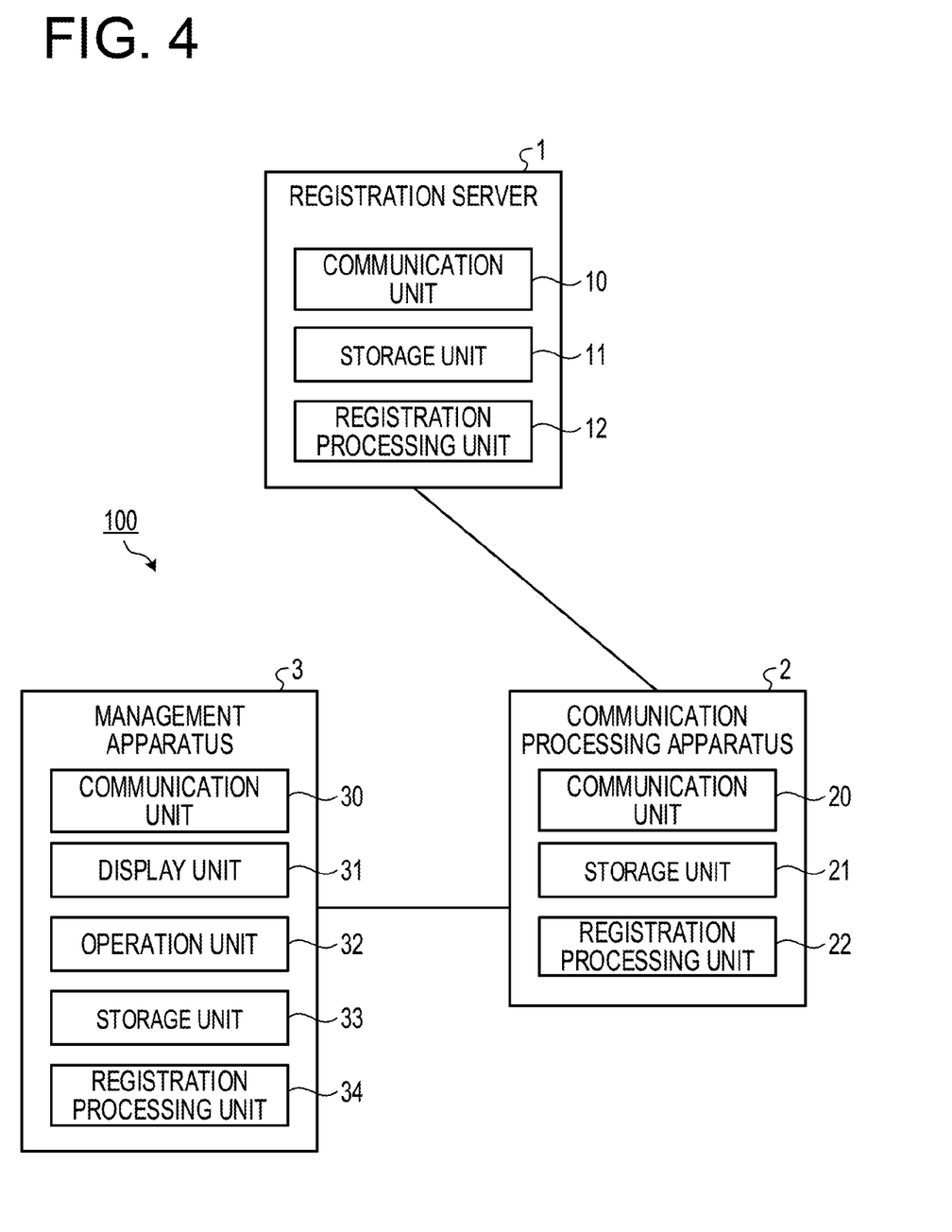
FIG. 4 is a block diagram illustrating a functional configuration example of a registration system according to an embodiment.

FIG. 4 is a block diagram illustrating a functional configuration example of a registration system 100 according to an embodiment. As illustrated in FIG. 4, the registration server 1 includes a communication unit 10, a storage unit 11, and a registration processing unit 12.

The communication unit 10 is an example of a second communication unit, and is, for example, a communication interface such as a network interface card (NIC) and communicates with the communication processing apparatus 2 through a communication network 4. The storage unit 11 is, for example, a storage device such as a hard disk drive (HDD). A registration processing unit 12 is an example of a second registration processing unit and performs a process on the registration server 1 side for registration with the communication processing apparatus 2.

Specifically, upon receiving the registration request from the communication processing apparatus 2 by the communication unit 10, the registration processing unit 12 verifies the signature of the information of the authentication key included in the registration request using the registration key verifier (KRV). In addition, the registration processing unit 12 registers information of the authentication key included in the registration request based on the verification result of the registration key verifier KRV.

The communication processing apparatus 2 includes a communication unit 20, a storage unit 21, and a registration processing unit 22. The communication unit 20 is, for example, the communication interface such as an NIC and communicates with the registration server 1 through the communication network 4. Further, the communication unit 20 communicates with the management apparatus 3 connected by the local communication. When the registration processing unit 22 is connected with the management apparatus 3 via the local communication, the registration processing unit 22 performs a process on the communication processing apparatus 2 side for the registration with the registration server 1.

Specifically, the registration processing unit 22 transmits the information of the authentication key to the management apparatus 3 by the communication unit 20 and accepts the information of the authentication key completed with the signature from the management apparatus 3. Further, when the registration processing unit 22 accepts the information of the authentication key completed with the signature from the management apparatus 3, the registration processing unit 22 transmits the registration request including the information of the authentication key completed with the signature to the registration server 1 by the communication unit 20.

The management apparatus 3 includes a communication unit 30, a display unit 31, an operation unit 32, a storage unit 33, and a registration processing unit 34. The communication unit 30 is an example of a first communication unit, and is, for example, the communication interface such as the NIC and communicates with the communication processing apparatus 1 connected by the local communication. The display unit 31 is a display unit such as a liquid crystal display. The operation unit 32 is an operation button disposed on an outer surface of the management apparatus 3 or a transparent touch panel overlapped with the display unit 31, etc. and accepts an operation input of the user. The storage unit 33 is, for example, the storage device such as the HDD. The registration processing unit 34 is an example of a first registration processing unit and when the registration processing unit 34 is connected with the communication processing apparatus 2 by the local communication, the registration processing unit 34 performs a process on the management apparatus 3 side for the registration with the registration server 1 and the communication processing apparatus 2.

Specifically, upon accepting the information of the authentication key for the registration from the communication processing apparatus 2, the registration processing unit 34 signs the authentication key information with the registration key KV and transmits the information of the authentication key completed with the signature to the communication processing apparatus 2 by the communication unit 30.

[Preliminary Preparation]

As a preliminary preparation before the registration process, initial data and data obtained by the preliminary preparation are registered in the storage units 11, 21, and 33 of the registration server 1, the communication processing apparatus 2, and the management apparatus 3.

Figure 5:
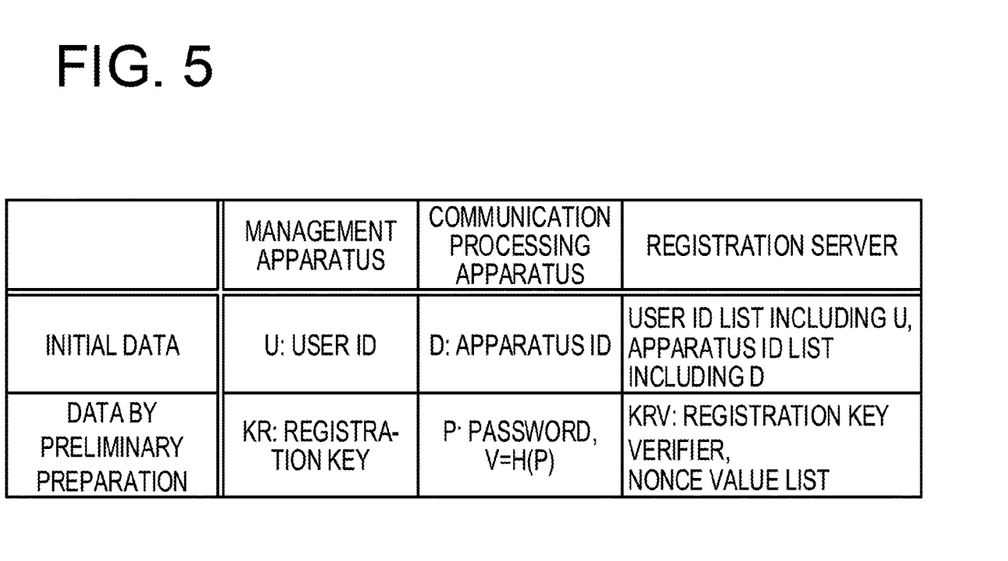
FIG. 5 is an explanatory diagram for describing an example of storage contents of a registration system according to an embodiment.

FIG. 5 is an explanatory diagram for describing an example of storage contents of a registration system 100 according to an embodiment. As illustrated in FIG. 5, as the initial data, the storage unit 33 of the management apparatus 3 stores the user ID U that identifies the user. Further, the storage unit 21 of the communication processing apparatus 2 stores the apparatus ID D of the communication processing apparatus 2 itself. In addition, the storage unit 11 of the registration server 1 stores a user ID list including the user ID U and an apparatus ID list including the apparatus ID D.

As the preliminary preparation, the registration key pair (KR, KRV) is generated, and the management apparatus 3 stores the registration key KR and the registration server 1 stores the registration key verifier KRV, respectively, as data obtained by the preliminary preparation.

For example, the user acquires the registration key KR in advance from the registration server 1 and saves the acquired registration key KR in the management apparatus 3. In a saving method of the registration key KR in the management apparatus 3, for example, information of the registration key KR (a character string or a numeral string) may be read while viewing a display screen of the registration server 1 and input in the management apparatus 3. Alternatively, a file including the registration key KR is accepted from the registration server 1 to record the file in the registration server 1 using a USB memory, etc. Alternatively, when the management apparatus 3 has a network communication function, the registration key KR may be accepted through communication with the registration server 1 using the management apparatus 3.

In the preliminary preparation, the communication processing apparatus 2 randomly generates a password P which is an authentication key of the communication processing apparatus 2 in advance and calculates an authentication key verifier V=H(P) so as to hold P and V. H(•) is configured to be a safe hash function. Moreover, it is assumed that the registration server 1 holds a list of nonce values (number used once) included in the registration request received up to a predetermined time (a nonce value list of which reception is completed).

[Operational Example of Registration Process]

Figure 6:
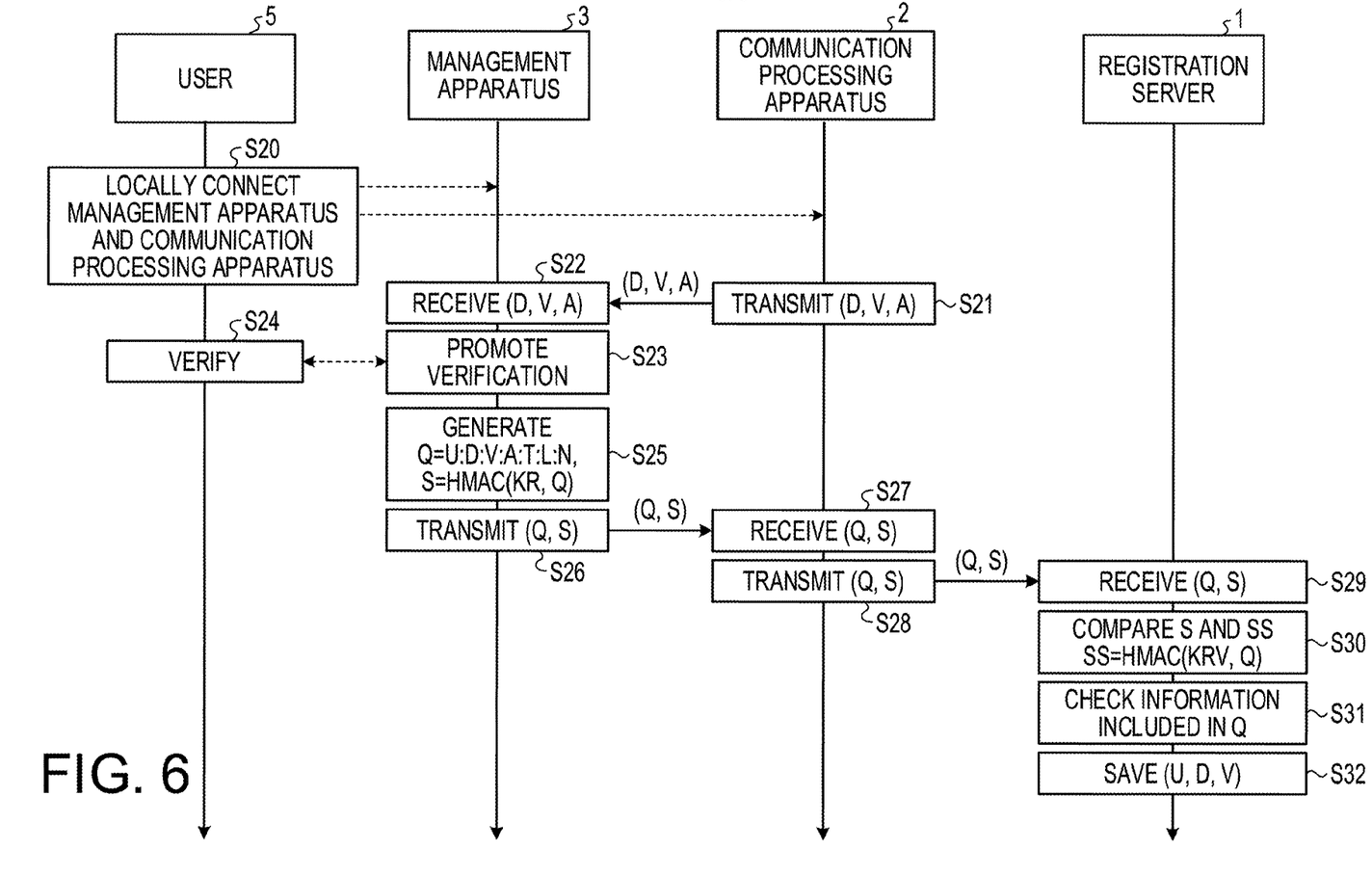
FIG. 6 is a sequence diagram illustrating an operational example of a registration system according to an embodiment.

Details of the process related to the registration of the communication processing apparatus 2 will be described. FIG. 6 is a sequence diagram illustrating an operational example of a registration system 100 according to an embodiment.

As illustrated in FIG. 6, when the user 5 has the management apparatus 3, goes to the side of the communication processing apparatus 2, and then starts a registration work, the registration process is performed in the order of S20 to S32 as described below.

First, the user 5 locally connects the management apparatus 3 and the communication processing apparatus 2 using a USB cable, etc. (S20). Subsequently, the communication units 30 and 20 of the management apparatus 3 and the communication processing apparatus 2 recognize that the communication units 30 and 20 are connected and the registration processing units 22 and 34 start respective corresponding registration processes.

The registration processing unit 22 of the communication processing apparatus 2 transmits the (D, V, and A) to the management apparatus 3 via the communication unit 20 (S21). Here, the symbol A may be additional information of the communication processing apparatus 2 and predetermined data. For example, the additional information A may include a model name, a model number, a serial number, and the like of the communication processing apparatus 2.

Next, the management apparatus 3 receives the (D, V, and A) (S22), and the registration processing unit 34 displays the apparatus ID D and the additional information A on the screen of the display unit 31 and prompts verification as to whether to continue the registration process to the user 5 (S23). The user 5 verifies contents displayed in the display unit 31 (S24) and indicates whether to continue the registration process from the operation unit 32.

When the user instructs continuing the registration process, the registration processing unit 34 of the management apparatus 3 generates data Q=U:D:V:A:T:L:N. However, x:y represented by a symbol ":" indicates a connection between data x and data y (data x and y may be connected by being delimited with predefined delimiter data or when data x has a fixed length, data x and y may be simply connected with no delimiter data).

Here, the symbol T represents current time information timed by the management apparatus 3. The symbol L represents location information of the management apparatus 3 which the management apparatus 3 observes by a unit such as a global positioning system (GPS). The symbol N represents a nonce value randomly generated by the management apparatus 3.

The registration processing unit 34 of the management apparatus 3 generates a signature S=HMAC(KR, Q) (S25). However, HMAC(k, x) indicates a message authentication code by a hash for data x by the key k. That is, the registration processing unit 34 generates a signed message S by the registration key KR with respect to data Q including the authentication key verifier V.

The registration processing unit 34 of the management apparatus 3 transmits the (Q and S) to the communication processing apparatus 2 via the communication unit 30 (S26). The communication unit 20 of the communication processing apparatus 2 receives the (Q and S) from the management apparatus 3 (S27).

The registration processing unit 22 of the communication processing apparatus 2 that receives the (Q and S) transmits the (Q and S) as the registration request to the registration server 1 from the communication unit 20 via the communication network 4 (S28). The communication unit 10 of the registration server 1 receives the registration request (Q and S) (S29).

The registration processing unit 12 of the registration server 1 identifies the registration key KR of the user 5 using the user ID U included in the received data Q. Next, the registration processing unit 12 generates SS=HMAC(KR, Q), compares the generated SS=HMAC(KR, Q) with the received S, and examines whether S and SS are the same as each other (S30).

When S and SS are the same as each other, the registration processing unit 12 may regard that the registration request (Q, S) passes through the management apparatus 3 of the correct user 5. Accordingly, when S and SS are the same as each other, the registration processing unit 12 continues the registration process. Further, when S and SS are not the same as each other, the registration processing unit 12 terminates the registration process without registering the authentication key verifier V, etc.

When S and SS are the same as each other, the registration processing unit 12 further checks whether the information included in Q satisfies a predetermined registration condition (S31). Specifically, the registration processing unit 12 verifies whether the apparatus ID D, the additional information A, the time information T, the location information L, and the nonce value N included in Q are within the range of the registration condition.

For example, the registration processing unit 12 verifies whether the apparatus ID D is included in the apparatus ID list of the correct communication processing apparatus 2 which is held in advance. Alternatively, the registration processing unit 12 verifies whether the additional information A corresponds to the model name of the communication processing apparatus 2 in which the registration work is allocated to the user 5.

Alternatively, the registration processing unit 12 verifies whether the time information T is within a predetermined time (e.g., within 10 seconds) from a current time recognized by the registration server 1. Alternatively, the registration processing unit 12 verifies whether the location information L is within a range of a work place allocated to the user 5.

Alternatively, the registration processing unit 12 verifies whether the nonce value N is not included in the nonce value list of which reception is completed. Further, when the nonce value N is not included in the nonce value list, the registration processing unit 12 adds N to the nonce value list.

Alternatively, when the registration processing unit 12 is able to know a network address of the communication processing apparatus 2 which is a transmission source at the time of receiving the registration request, the registration processing unit 12 may verify whether the network address is included in an address range allocated to the user 5.

As a result of the verification, when the registration condition is satisfied, the registration processing unit 12 of the registration server 1 saves the (U, D, and V) in the storage unit 11 as information of the communication processing apparatus 2 which is registered (S32). In this case, the registration processing unit 12 may also save A, T, L, etc. in the storage unit 11 as additional information in registration.

[Modification of Registration Process]

As a modification of the operation example, an example is described, in which the registration server 1 side issues the provisional registration ID and the registration server 1 manages the number of available registration times of the user 5. Further, in the modification described below, it is assumed that a key pair of a symmetric key encryption is used as the registration key pair (KR, KRV) and a private key SK and a public key PK of a public key encryption are used as the authentication key pair (K, V), respectively.

Figure 7:
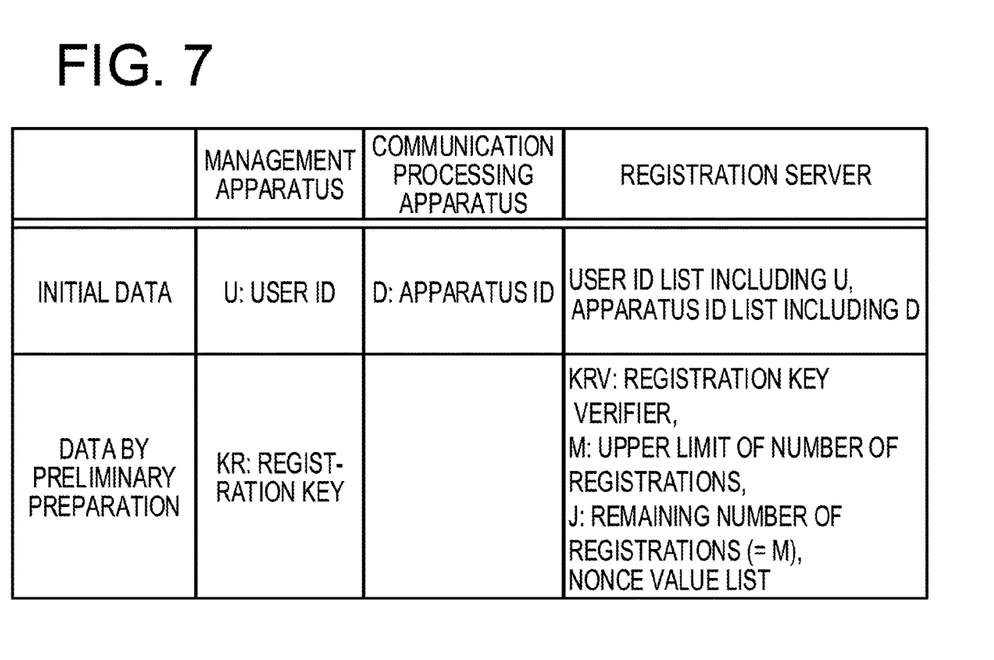
FIG. 7 is an explanatory diagram illustrating an example of storage contents of a registration system according to a modification.

FIG. 7 is an explanatory diagram illustrating an example of storage contents of a registration system 100 according to a modification. As the preliminary preparation in the modification, the initial data and the data obtained by the preliminary preparation illustrated in FIG. 7 are registered in the storage units 11, 21, and 33 of the registration server 1, the communication processing apparatus 2, and the management apparatus 3.

For example, as the preliminary preparation, the registration key pair (KR, KRV) is generated such that, as data obtained by the preliminary preparation, the management apparatus 3 and the registration server 1 store the registration key KR and the registration key verifier KRV, respectively.

The registration server 1 predetermines an upper limit M of the number of available registration times with respect to the user 5 and saves the remaining number J of available registration times as an initial value J=M. Further, it is assumed that the authentication key K and the authentication key verifier V of the communication processing apparatus 2 are generated at the time of the registration process.

Figure 8:
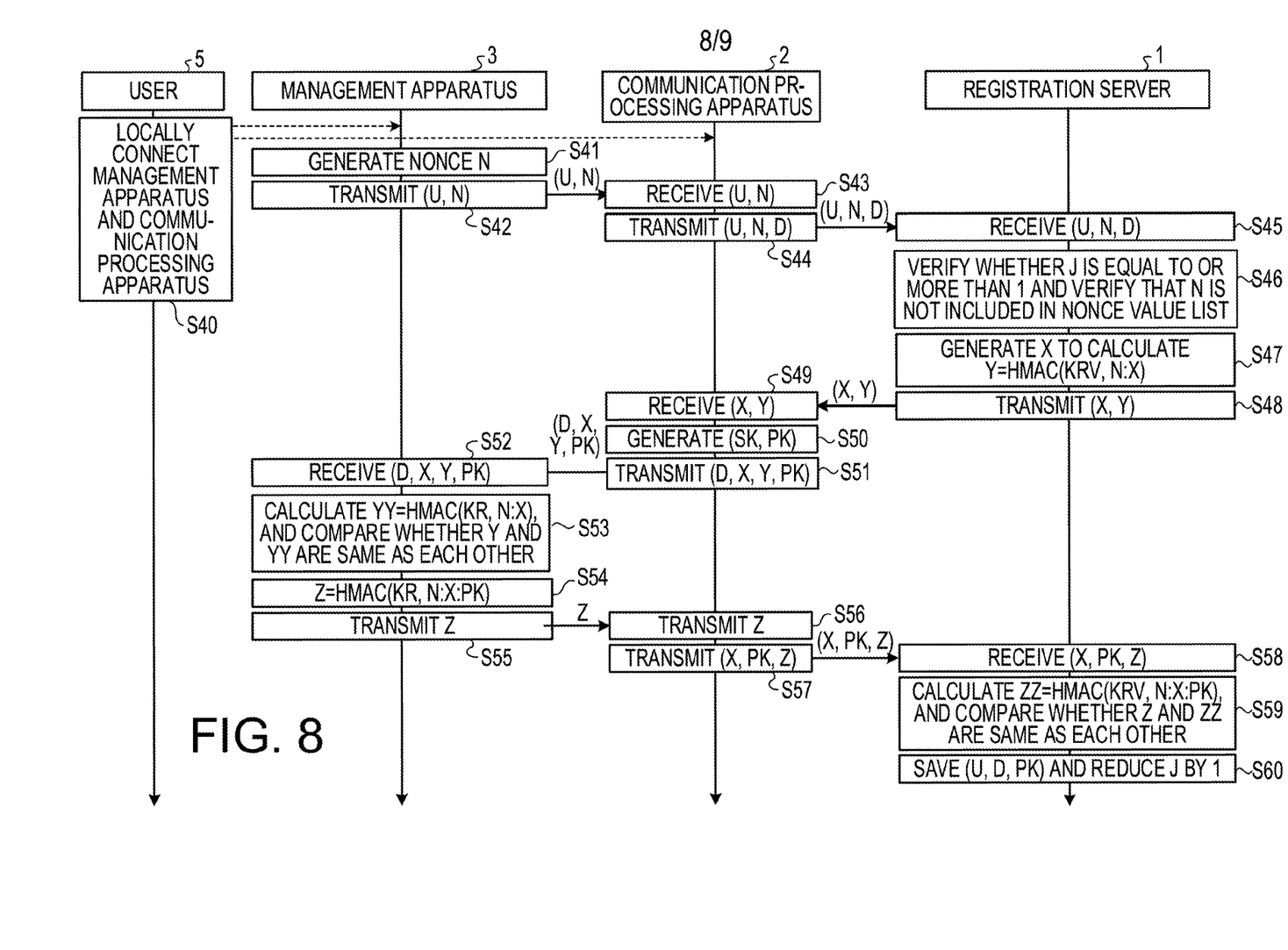
FIG. 8 is a sequence diagram illustrating an operational example of the registration system according to the modification.

FIG. 8 is a sequence diagram illustrating an operational example of a registration system 100 according to a modification. As illustrated in FIG. 8, when the user 5 has the management apparatus 3, goes to the side of the communication processing apparatus 2, and then starts the registration work, the registration process for the modification is performed in the order of S40 to S60 below.

First, the user 5 locally connects the management apparatus 3 and the communication processing apparatus 2 using the USB cable, etc. (S40). Subsequently, the communication units 30 and 20 of the management apparatus 3 and the communication processing apparatus 2 recognize that the communication units 30 and 20 are connected and the registration processing units 22 and 34 start respective corresponding registration processes.

The registration processing unit 34 of the management apparatus 3 randomly generates the nonce value N and temporarily stores the generated nonce value in a memory or the like (S41). Next, the registration processing unit 34 transmits (U and N) through the communication unit 30 (S42). The communication unit 20 of the communication processing apparatus 2 receives (U and N) from the management apparatus 3 (S43).

The registration processing unit 22 of the communication processing apparatus 2 that accepts (U and N) transmits (U, N, and D) as a provisional registration request to the registration server 1 via the communication unit 20 (S44). The communication unit 30 of the management apparatus 3 receives the provisional request (U, N, and D) from the communication processing apparatus 2 (S45).

The registration processing unit 12 of the registration server 1 that accepts the provisional request (U, N, and D)

verifies the remaining number of available registration times (3) of the user ID U included in the provisional registration request and the nonce value N (S46). Specifically, the registration processing unit 12 first verifies whether the remaining number of available registration times (3) of the user ID U is 1 or more. Here, the registration processing unit 12 denies the provisional registration request when the remaining number of available registration times (3) is less than 1 and the process proceeds to a subsequent process when the remaining number of available registration times (3) is equal to or more than 1. However, when there is a possibility that the registration server 1 may simultaneously perform a plurality of registration processes in parallel, a so called unit that suppresses a contention state needs to be devised, but in the embodiment, it is assumed that the unit is not asked.

Next, the registration processing unit 12 checks whether the nonce value N included in the provisional registration request is included in the nonce value list and when the nonce value N is included in the nonce value list, the registration processing unit 12 denies the provisional registration request and when the nonce value N is not included in the nonce value list, the process proceeds to the subsequent process.

Next, the registration processing unit 12 randomly generates a provisional registration ID X and temporarily saves the (U, D, and X). Moreover, the registration processing unit 12 calculates Y=HMAC(KR, N:X) (S47) and transmits the (X and Y) to the communication processing apparatus 2 via the communication unit 10 (S48). The communication unit 20 of the communication processing apparatus 2 receives the (X and Y) from the registration server 1 (S49).

The registration processing unit 22 of the communication processing apparatus 2 that accepts the (X and Y) generates a pair(SK, PK) of the authentication key and the authentication key identifier as a pair of the private key of the publication key encryption and the public key (S50) so as to temporarily save the (X, SK, and PK) in the memory, etc. Next, the registration processing unit 22 transmits the (D, X, Y, and PK) to the management apparatus 3 through the communication unit 20 (S51). The communication unit 30 of the management apparatus 3 receives the (D, X, Y, and PK) from the communication processing apparatus 2 (S52).

The registration processing unit 34 of the management apparatus 3 that accepts the (D, X, Y, and PK) calculates YY=HMAC(KR, N:X) so as to compare whether Y and YY are the same as each other (S53). When Y and YY are not the same as each other, the registration processing unit 34 terminates the registration process.

When Y and YY are the same as each other, the registration processing unit 34 continues the registration process to calculate Z=HMAC(KR, N:X:PK) (S54) and transmits Z to the communication processing apparatus 2 via the communication unit 30 (S55). The communication unit 20 of the communication processing apparatus 2 receives Z from the management apparatus 3 (S56).

The registration processing unit 22 of the communication processing apparatus 2 that accepts Z transmits the (X, PK, and Z) as the registration request to the registration server 1 from the communication unit 20 via the communication network 4 (S57). The communication unit 10 of the registration server 1 receives the registration request (X, PK, Z) (S58).

Subsequently, the registration processing unit 12 of the registration server 1 reads the temporarily saved data (U, D, and X) corresponding to X, reads KR corresponding to U, and calculates ZZ=HMAC (KR, N:X:PK). Next, the registration processing unit 12 compares whether Z and ZZ are the same as each other (S59). When Z and ZZ are the same as each other, the registration processing unit 12 may know that the registration request (X, PK, and Z) passes through the management apparatus 3 of the correct user 5 with respect to the provisional registration ID X.

Therefore, when Z and ZZ are the same as each other, the registration processing unit 12 of the registration server 1 saves the (U, D, and PK) in the storage unit 11 as information of the communication processing apparatus 2 which is registered and reduces the remaining number of available registration times (3) of the user 5 by 1 (S60). Further, when Z and ZZ are not the same as each other, the registration processing unit 12 terminates the registration process without registering (U, D, and PK), etc.

As described above, a registration system 100 includes a registration server 1, a communication processing apparatus 2, and a management apparatus 3. The management apparatus 3 and the registration server 1 hold the registration key KR and registration key verifier KRV which are paired with each other. The management apparatus 3 includes a communication unit 30 which communicates with the communication processing apparatus 2 and a registration processing unit 34. Upon accepting the information of the authentication key K for the registration from the communication processing apparatus 2, the registration processing unit 34 signs the information of the authentication key K with the registration key KR and transmits the information of the authentication key after signing to the communication processing apparatus 2 by the communication unit 30.

The communication processing apparatus 2 includes the communication unit 20 which communicates with the management apparatus 3 and the registration server 1, and a registration processing unit 22. When the registration processing unit 22 transmits the information of the authentication key K to the management apparatus 3 by the communication unit 20 and accepts the information of the authentication key after the signature from the management apparatus 3, the registration processing unit 22 transmits the registration request including the information of the authentication key after signing to the registration server 1 by the communication unit 20.

The registration server 1 includes the communication unit 10 which communicates with the communication processing apparatus 2 and a registration processing unit 12. Upon accepting the registration request from the communication processing apparatus 2 by the communication unit 10, the registration processing unit 12 verifies the signature of the information of the authentication key included in the registration request using the registration key verifier (KRV), and registers the information of the authentication key included in the registration request based on the verification result.

As a result, the registration system 100 may safely and simply perform the registration work in the registration server 1 of the communication processing apparatus 2. For example, since the management apparatus 3 does not transmit the registration key KR for the authentication to an external apparatus, even when a fake communication processing apparatus 2, etc. is locally connected to the management apparatus 3, there is no case where the registration key KR is known to the outside. Further, the registration work may be performed when the registration server 1 and the communication processing apparatus 2 may communicate with each other. As a result, apart from the communication processing apparatus 2, the management apparatus 3 side may omit a time required for preparing a communication environment to communicate with the registration server 1.

The registration server 1 holds the registration condition associated with the registration key KR. The registration processing unit 12 of the registration server 1 verifies whether the information separate from the information of the authentication key included in the registration request from the communication processing apparatus 2 (e.g., the apparatus ID D, the additional information A, the location information L, etc.) coincides with the held registration condition. In addition, the registration processing unit 12 registers the information of the authentication key included in the registration request based on whether the corresponding information coincides with the registration condition. When the registration condition is satisfied as such, the information of the authentication key is registered, and as a result, the registration system 100 may perform a safer registration.

The registration processing unit 22 of the communication processing apparatus 2 puts the signature including timing information which indicates information at the time of the signing (the number of signatures, date and time information, nonce value, etc.). In addition, the registration processing unit 12 of the registration server 1 registers the information of the authentication key included in the registration request based on whether the information at the time of the signature indicated by the timing information included in the signature satisfies a predetermined condition. Specifically, when conditions are satisfied, which include a condition in which the number of signatures is equal to or less than a predetermined value, a condition in which the date and time range is within a set value, a condition in which the nonce value is not used in the past, and the like, the information of the authentication key is registered. When the information at the time of the signature satisfies a predetermined condition, the information of the authentication key is registered, and as a result, the registration system 100 may perform a safer registration.

The registration processing unit 12 of the registration server 1 issues the identification information for the registration (provisional ID X) and transmits the issued identification information to the communication processing apparatus 2 based on a request from the communication processing apparatus 2 according to a communication connection with the management apparatus 3. The registration processing unit 22 of the communication processing apparatus 2 transmits the issued identification information included in the information of the authentication key to the management apparatus 3 through the communication unit 20. Further, when the registration processing unit 22 accepts the information of the authentication key including the identification information after signing from the management apparatus 3, the registration processing unit 22 transmits the registration request that includes the information of the authentication key including the identification information completed with the signature to the registration server 1 through the communication unit 20. The registration processing unit 12 of the registration server 1 verifies the signature of the information of the authentication key that includes the identification information included in the registration request using the registration key and the identification information. As such, the identification information issued on the registration server 1 side is signed with the registration key by the management apparatus 3 and verified using the registration key and the identification information As a result, whether the corresponding registration work is the registration work using the correct management apparatus 3 may be verified with precision. Therefore, it is possible to perform a safer registration.

The communication unit 10 of the registration server 1 signs the identification information (provisional registration ID X) with the registration key KRV and transmits the identification information completed with the signature to the communication processing apparatus 2. Upon receiving the information of the authentication key including the identification information completed with the signature from the communication processing apparatus 2, the registration processing unit 34 of the management apparatus 3 verifies the signature of the identification information using the registration key KR and verifies the validity of the identification information based on the verification result. As described above, by verifying the validity of the identification information issued on the registration server 1 side using the registration keys KR and KRV on the management apparatus 3 side, it may be verified with high precision whether both the registration server 1 and the management apparatus 3 are correct, thereby achieving a safer registration.

The communication unit 30 of the management apparatus 3 issues the nonce value according to communication connection with the communication processing apparatus 2 and transmits the issued nonce value to the communication processing apparatus 2. The communication unit 20 of the communication processing apparatus 2 transmits a request by the communication connection including the nonce value issued by the management apparatus 3 according to the communication connection to the registration server 1. When the nonce value included in the request from the communication processing apparatus 2 is not included in the nonce value list holding the past nonce value, the communication unit 10 of the registration server 1 issues the identification information (provisional registration ID X). As described above, when the nonce values issued by the management apparatus 3 do not overlap with each other, the identification information for the registration is issued to suppress overlapped registration operations, thereby achieving the safer registration.

[Other Modifications]

Each component of each apparatus illustrated in the figures needs not particularly be configured as physically illustrated. That is, a concrete form of distribution and integration of each apparatus is not limited to the illustration and all or a portion thereof may be configured to be functionally or physically distributed and integrated by a predetermined unit according to various loads or use situations.

Various processing functions performed by the registration server 1, the communication processing apparatus 2, and the management apparatus 3 are typically configured as a program which operates on a computer and further, in many cases, various processing functions are implemented as a form in which the functions are inserted as a portion of other program. However, the functions are not particularly limited to such an implementation form and may be implemented as hardware such as an electronic circuit, or implemented as a function of an integrated circuit.

For example, all or predetermined portions of various processing functions performed by the registration server 1, the communication processing apparatus 2, and the management apparatus 3 may be executed on a CPU (or microcomputer such as an MPU or a micro controller unit (MCU)). In addition, all or predetermined portions of various processing functions may be executed on a program interpreted and executed by the CPU (or a microcomputer such as an MPU or a micro controller unit (MCU)) or hardware by a wired logic. Further, various processing functions performed by the registration server 1 may be executed through cooperation of a plurality of computers by cloud computing.

Figure 9:
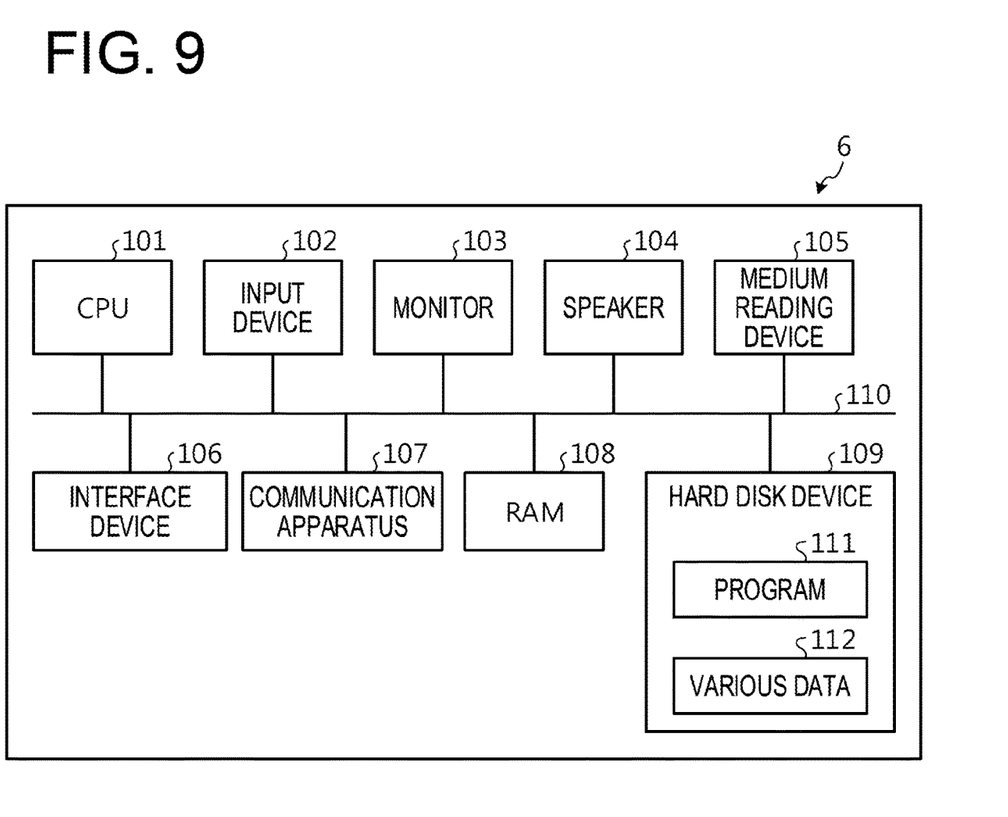
FIG. 9 is an explanatory diagram for describing an example of a computer executing a program.

However, various processes described in the embodiment may be implemented by executing a previously prepared program by the computer. Therefore, hereinafter, an example of the computer (hardware) that executes the program having the same function as the embodiment will be described. FIG. 9 is an explanatory diagram for describing an example of a computer that executes a program.

As illustrated in FIG. 9, a computer 6 includes a CPU 101 that executes various operation processes, an input device 102 that accepts a data input, a monitor 103, and a speaker 104. Further, the computer 6 includes a medium reading device 105 that reads the program, etc. from the storage medium, an interface device 106 that connects with various apparatuses, and a communication apparatus 107 for communication connection with the external apparatus by a wired or wireless scheme. In addition, the computer 6 includes a RAM 108 that temporarily stores various kinds of information and a hard disk device 109. Further, each of the units 101 to 109 in the management apparatus 3 is connected to a bus 110.

A program 111 that executes various processes in the registration processing units 12, 22, and 34, etc. described in the embodiment is stored in the hard disk device 109. Further, the hard disk device 109 stores various data 112 which the program 111 refers to. The input device 102 accepts an input of operation information, for example, from an operator of the management apparatus 3. The monitor 103 displays various screens operated by, for example, the operator. For example, a printing device or the like is connected to the interface device 106. The communication apparatus 107 is connected to a communication network such as a local area network (LAN) to exchange various information with the external apparatus through the communication network.

The CPU 101 reads the program 111 stored in the hard disk device 109 and loads the program to a RAM 108 so as to execute the loaded program and implement functioning units including the registration processing units 12, 22, 34, etc. Further, the program 111 may not be stored in the hard disk device 109. For example, the program 111 stored in the storage medium readable by the computer 6 may be read and executed by the computer 6. The storage medium readable by the computer 6 corresponds to, for example, a portable recording medium such as a CD-ROM, a DVD disk, or a universal serial bus (USB) memory, a semiconductor memory such as a flash memory or a hard disk drive. Further, the program 111 may be stored in the apparatus connected to a public line, the Internet, the LAN, etc., and the computer 6 may read and execute the program 111 from the public line, the Internet, the LAN, and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A registration system comprising:
   a management apparatus configured to include:
      a first memory configured to store a first registration key, and
      a first processor coupled to the first memory and the first processor configured to:
         acquire first information of an authentication key for registration from a communication processing apparatus to communicate with the management apparatus,
         put a signature for the first information with the first registration key, and
         transmit the first information completed with the signature to the communication processing apparatus; and
   a registration server configured to include:
      a second memory configured to store a second registration key paired with the first registration key, and
      a second processor coupled to the second memory and the second processor configured to:
         acquire a registration request including the first information completed with the signature by the management apparatus from the communication processing apparatus to communicate with the registration server,
         verify the signature put for the first information included in the registration request, by using the second registration key, and
         register the first information included in the registration request, based on a result of verifying the signature put for the first information.

2. The registration system according to claim 1, wherein the second memory is configured to store a registration condition associated with the second registration key, and
   wherein the second processor is configured to register the first information included in the registration request, based on whether second information of the authentication key included in the registration request satisfies the registration condition.

3. The registration system according to claim 1, wherein the first processor is configured to put the signature including timing information for indicating information at a time of putting the signature, and
   wherein the second processor is configured to register the first information included in the registration request, based on whether the timing information included in the signature satisfies a predetermined condition.

4. The registration system according to claim 1, wherein the second processor is configured to generate identification information for the registration, based on a request from the communication processing apparatus according to a communication connection with the management apparatus, and transmit the generated identification information to the communication processing apparatus,
   wherein, when the first processor acquires the first information including the identification information from the communication processing apparatus, the first processor is configured to put the signature for the first information with the first registration key and transmit the first information including the identification information completed with the signature to the communication processing apparatus, and
   wherein, when the second processor acquires the registration request including the first information completed with the signature by the management apparatus from the communication processing apparatus, the second processor is configured to verify the signature put for the first information including the identification information included in the registration request, by using the second registration key and the identification information.

5. The registration system according to claim 4, wherein the second processor is configured to transmit the identification information completed with the signature with the second registration key to the communication processing apparatus, and wherein, when the first processor acquires the first information including the identification information completed with the signature from the communication processing apparatus, the first processor is configured to verify the signature put for the identification information by using the first registration key and verify validity of the identification information, based on a result of verifying the signature put for the identification information.

6. The registration system according to claim 4, wherein the first processor is configured to generate a nonce value according to the communication with the communication processing apparatus and transmit the nonce value to the communication processing apparatus, and wherein the second processor is configured to generate the identification information, when the nonce value generated by the first processor and transmitted from the management apparatus, which is included in the request from the communication processing apparatus, is not included in a nonce value list that holds a past nonce value.

7. The registration system according to claim 1, wherein the second processor is configured to:
generate a second signature using the first information and the second registration key;
compare the second signature with the signature; and
register the first information included in the registration request when the second signature and the signature are the same.

8. A registration method for a registration system including a management apparatus and a registration server, the registration method comprising:
acquiring first information of an authentication key for registration from a communication processing apparatus to be registered in the registration server, the communication processing apparatus communicating with the management apparatus and the registration server, by a first processor of the managing apparatus;
putting a signature for the first information with a first registration key hold in the management apparatus, by the first processor;
transmitting the first information completed with the signature to the communication processing apparatus, by the first processor;
acquiring a registration request including the first information completed with the signature by the management apparatus from the communication processing apparatus, by a second processor of the registration server;
verifying the signature put for the first information included in the registration request, by using a second registration key hold in the registration server, the second registration key being paired with the first registration key, by the second processor; and
registering the first information included in the registration request, based on a result of verifying the signature put for the first information, by the second processor.

9. The registration method according to claim 8, wherein the registration server holds a registration condition associated with the second registration key, and
wherein the second processor registers the first information included in the registration request, based on whether second information of the authentication key included in the registration request satisfies the registration condition.

10. The registration method according to claim 8, wherein the first processor puts the signature including timing information for indicating information at a time of putting the signature, and
wherein the second processor registers the first information included in the registration request, based on whether the timing information included in the signature satisfies a predetermined condition.

11. The registration method according to claim 8, wherein the second processor generates identification information for the registration, based on a request from the communication processing apparatus according to a communication connection with the management apparatus, and transmits the generated identification information to the communication processing apparatus,
wherein, when the first processor acquires the first information including the identification information from the communication processing apparatus, the first processor is configured to put the signature for the first information with the first registration key and transmit the first information including the identification information completed with the signature to the communication processing apparatus, and
wherein, when the second processor acquires the registration request including the first information completed with the signature by the management apparatus from the communication processing apparatus, the second processor verifies the signature put for the first information including the identification information included in the registration request, by using the second registration key and the identification information.

12. The registration method according to claim 11, wherein the second processor transmits the identification information completed with the signature with the second registration key to the communication processing apparatus, and
wherein, when the first processor acquires the first information including the identification information completed with the signature from the communication processing apparatus, the first processor verifies the signature put for the identification information by using the first registration key and verifies validity of the identification information, based on a result of verifying the signature put for the identification information.

13. The registration method according to claim 11, wherein the first processor generates a nonce value according to the communication with the communication processing apparatus and transmits the nonce value to the communication processing apparatus, and
wherein the second processor generates the identification information, when the nonce value generated by the first processor and transmitted from the management apparatus, which is included in the request from the communication processing apparatus, is not included in a nonce value list that holds a past nonce value.

\* \* \* \* \*